United States Patent
Wolf et al.

(10) Patent No.: US 10,027,262 B2
(45) Date of Patent: Jul. 17, 2018

(54) PSEUDORANDOM PWM VARIATION BASED ON MOTOR OPERATING POINT

(71) Applicant: FORD GLOBAL TECHNOLOGIES, LLC, Dearborn, MI (US)

(72) Inventors: Christopher M. Wolf, South Bend, IN (US); Michael W. Degner, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 7 days.

(21) Appl. No.: 15/263,677

(22) Filed: Sep. 13, 2016

(65) Prior Publication Data
US 2018/0076744 A1    Mar. 15, 2018

(51) Int. Cl.
 *H02K 29/06* (2006.01)
 *H02P 6/10* (2006.01)

(52) U.S. Cl.
 CPC ..................... *H02P 6/10* (2013.01)

(58) Field of Classification Search
 CPC ........................................... H02P 6/10
 USPC .................................... 318/400.23
 See application file for complete search history.

(56) References Cited

U.S. PATENT DOCUMENTS

| | | | |
|---|---|---|---|
| 8,390,224 B2 | 3/2013 | Klippert | |
| 8,649,923 B2 | 2/2014 | Sankaran et al. | |
| 8,866,435 B2 * | 10/2014 | Suhama | H02P 27/085 318/400.09 |
| 8,907,604 B2 | 12/2014 | Miller et al. | |
| 2007/0279948 A1 * | 12/2007 | Shin | H02M 7/53875 363/41 |
| 2010/0052583 A1 * | 3/2010 | Takamatsu | B60L 11/18 318/400.09 |
| 2010/0185350 A1 * | 7/2010 | Okamura | B60L 11/08 701/22 |
| 2010/0201299 A1 | 8/2010 | Emde et al. | |

FOREIGN PATENT DOCUMENTS

| | | |
|---|---|---|
| EP | 2040360 A1 | 3/2009 |
| WO | 2011045192 A2 | 4/2011 |

* cited by examiner

*Primary Examiner* — Erick Glass
(74) *Attorney, Agent, or Firm* — David B. Kelley; MacMillan, Sobanski & Todd, LLC (57) ABSTRACT

An electric drive for a vehicle uses an inverter circuit configured to provide a multi-phase AC drive signal to an electric machine according to a PWM drive signal. A PWM controller monitors an operating point of the electric drive and is configured to identify an operating region of the electric drive from a plurality of predetermined regions in response to the monitored operating point. A sequence memory stores a plurality of sequences, each sequence optimized for a respective one of the predetermined regions to reduce audible noise and switching losses. The PWM controller generates the PWM drive signal according to a respective sequence corresponding to the identified operating region. Thus, the reduction of audible noise and switching losses is optimized based on torque and/or speed of the motor.

20 Claims, 6 Drawing Sheets

PSEUDORANDOM PWM VARIATION BASED ON MOTOR OPERATING POINT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to power converters including inverters for an electric drive system of an electrified vehicle, and, more specifically, to variation sequences of a pulse-width modulation signal which reduce noise and vibrations associated with the electric drive system.

Electric vehicles, such as hybrid electric vehicles (HEVs), plug-in hybrid electric vehicles (PHEVs), and battery electric vehicles (BEVs), use inverter-driven electric machines to provide traction torque. A typical electric drive system includes a DC power source (such as a battery pack or a fuel cell) coupled by contactor switches to a variable voltage converter (VVC) to regulate a main bus voltage across a main DC linking capacitor. An inverter is connected between the main buses for the DC link and a traction motor in order to convert the DC power to an AC signal that is coupled to the windings of the motor to propel the vehicle.

The inverters include transistor switching devices such as insulated gate bipolar transistors (IGBTs) connected in a bridge configuration having a plurality of phase legs. A typical configuration includes a three-phase motor driven by an inverter with three phase legs. An electronic controller turns the switches on and off in order to invert a DC voltage from the bus to an AC voltage applied to the motor. The inverters is controlled in response to various sensed conditions including the rotational position of the electric machine (for determining speed) and the current flow in each of the phases (for determining torque production).

The inverter for the motor may preferably pulse-width modulate the DC link voltage in order to deliver an approximation of a sinusoidal current output to drive the motor at a desired speed and torque. Pulse Width Modulation (PWM) control signals applied to the gates of the IGBTs turn them on and off as necessary so that the resulting current matches a desired current. To achieve the desired sinusoidal output voltages, the gate control signals are modulated by a carrier signal to produce a series of pulses that turn inverter switches on and off subject to a duty cycle that is derived by comparing an output of the motor to a desired output. The carrier signal is at a frequency that is higher than the frequency of the sinusoidal signal delivered to the motor so that the inverter output can be accurately controlled. Within the range of acceptable carrier frequencies, the use of a lower frequency is associated with reduced switching losses in the inverter. However, switching at frequencies within the audible spectrum can produce unpleasant high pitched whining and whistling noises that irritate automobile operators and passengers. Thus, some attempts to reduce audible noise have relied on carrier frequencies above the audible spectrum, but these have resulted in higher switching losses.

U.S. Pat. No. 8,907,604, Miller et al, entitled "PWM Frequency Pattern Optimization for NVH" discloses a pseudorandom variation of the PWM carrier frequency to optimally spread PWM energy and reduce audible noise. Spreading the noise energy between multiple carrier frequencies achieves sufficient noise reduction to allow the carrier frequencies to lie within the range of audible frequencies, whereby the increased switching losses associated with higher frequencies can be avoided. Nevertheless, it would be desirable to provide further optimization of noise and switching losses if possible.

SUMMARY OF THE INVENTION

The use of a pseudorandom sequence as in the prior art has provided inconsistent performance under variable operating conditions because the acoustic properties and behavior of an electric drive system varies according to vehicle operating point (e.g., as defined by the drive's torque, speed, and voltage). The invention uses multiple PWM algorithm sequences that are predetermined so that each sequence optimizes the acoustic behavior at a different operating point or range of operating points (i.e., region). A sequence refers to a sequential arrangement or pattern of modifications to the PWM algorithm. The modifications can include, but are not limited to, changes in the carrier frequency and changes in the common mode voltage component in the switching waveform. The sequences can be selected from a larger set of pseudorandomly generated sequences based on modeling of acoustic and/or switching loss performance, or through other methods of optimization.

In one aspect, the invention provides an electric drive for a vehicle comprising an inverter circuit configured to provide a multi-phase AC drive signal to an electric machine according to a PWM drive signal. A PWM controller monitors an operating point of the electric drive and is configured to identify an operating region of the electric drive from a plurality of predetermined regions in response to the monitored operating point. A sequence memory stores a plurality of sequences, each sequence optimized for a respective one of the predetermined regions to reduce audible noise and switching losses. The PWM controller generates the PWM drive signal according to a respective sequence corresponding to the identified operating region.

DETAILED DESCRIPTION OF PREFERRED EMBODIMENTS

Figure 1:
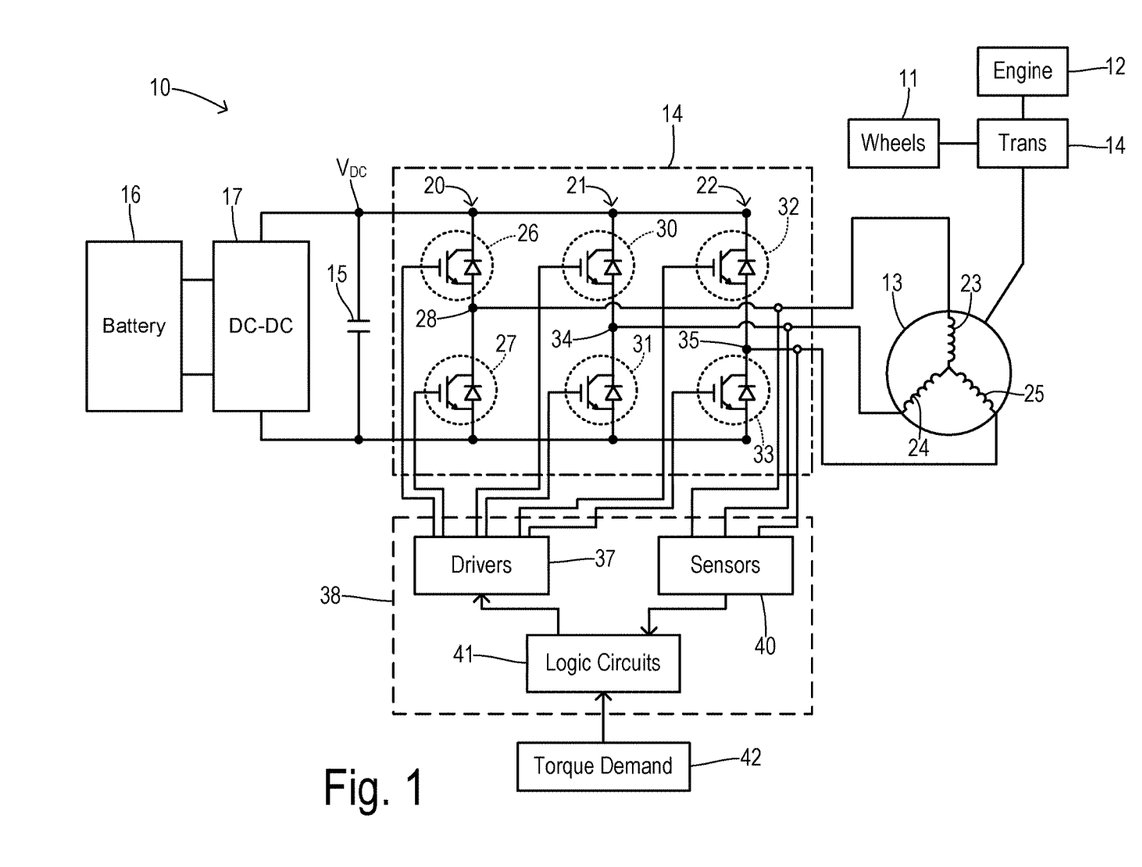
FIG. 1 is a schematic, block diagram showing a powertrain of an electrified vehicle according to one embodiment of the present invention.

FIG. 1 shows a hybrid electric vehicle 10 as one type of vehicle for implementing a PWM variation of the present invention. Vehicle wheels 11 may be driven by an internal combustion engine 12 and/or by a traction motor 13 via a transmission 14. For providing electric propulsion, motor 13 may be driven via an inverter switching bridge 15 that receives a DC link voltage at a DC link capacitor 16. The DC link voltage may result from conversion of DC power from a battery pack 17 by a converter 18 as known in the art.

Inverter 15 includes phase legs 20, 21, and 22 coupled to motor phase windings 23, 24, and 25. Phase leg 20 has an upper switching device 26 and a lower switching device 27 connected in series across DC link 16 and providing a junction 28 between devices 26 and 27 which is connected to winding 23 of motor 13. Similarly, phase leg 21 his upper switching device 30 and lower switching device 31, while phase leg 22 has upper switching device 32 and lower switching device 33. Junctions 34 and 35 are coupled to motor windings 24 and 25, respectively.

The switching devices may be comprised of IGBTs, antiparallel diodes, wide band gap FETs, or other devices. Each of the upper and lower switching devices has a respective gate terminal coupled to drivers 37 in a controller 38. Current sensors 40 coupled to each of the junctions of the phase legs measure the current flow through each phase winding. Measured current magnitudes are provided from sensors 40 to logic circuits 41 in controller 38 for use in determining PWM switching signals to be applied to the switching devices by drivers 37. As known in the art, the measured current may be compared with a desired motor current as determined according to a torque demand 42 that may be derived from operator input such as an accelerator pedal so that the operator can control the vehicle speed. Thus, current feedback determines a PWM duty cycle within logic circuits 41 that is then used to generate the timing of PWM switching signals for the phase leg switching devices.

Figure 2:
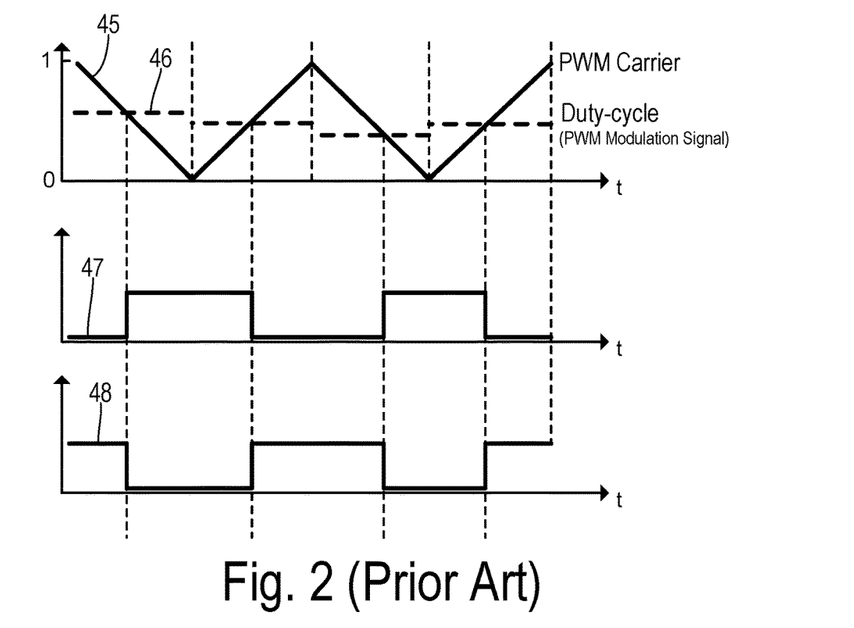
FIG. 2 is a waveform diagram showing the generation of PWM gate signals according to a carrier signal and a duty cycle.

FIG. 2 shows a PWM carrier signal 45 which is generated as a triangular waveform at a frequency (e.g., around 5 kHz) in the audible spectrum. The chosen frequency is higher than the rotation frequency of the motor. A PWM duty-cycle signal 46 is generated in response to any error between detected current and a target current (representing torque). Duty-cycle 46 is compared with PWM carrier signal 45 to generate a PWM drive signals 47 and 48 for one phase leg (prior to dead time insertion and other known adjustments). PWM drive signals for the other phase legs are obtained in the same manner.

Figure 3:
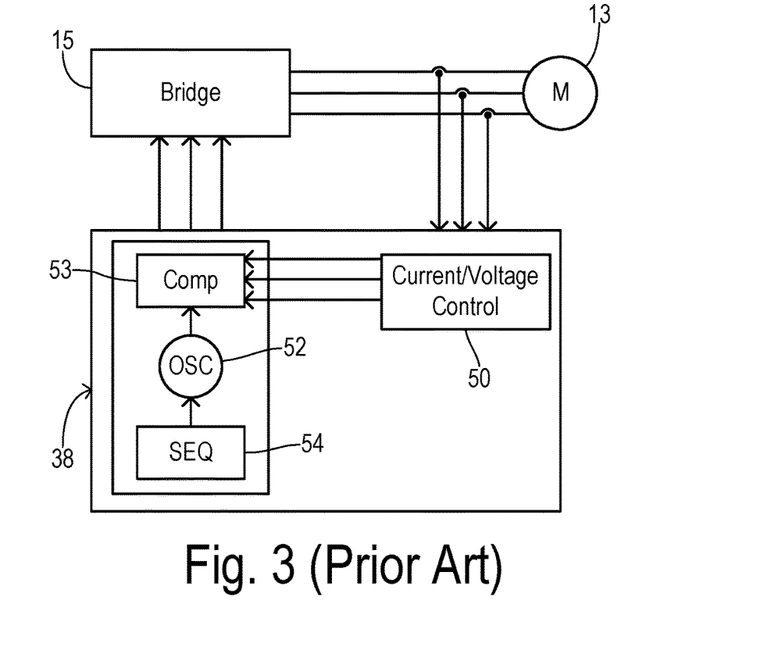
FIG. 3 is a block diagram showing a prior art use of one pseudorandom noise-reduction sequence operating independently of the motor operating point.
Figure 4:
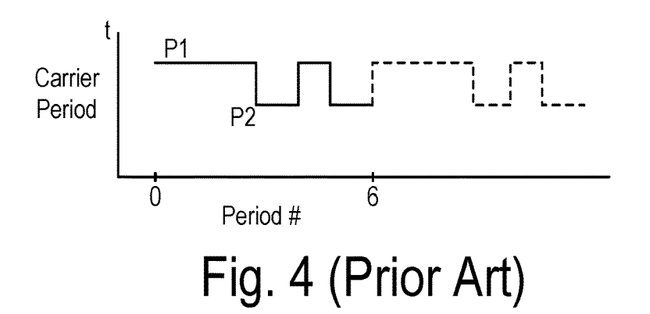
FIG. 4 is a graphic representation of a prior art sequence.
Figure 5:
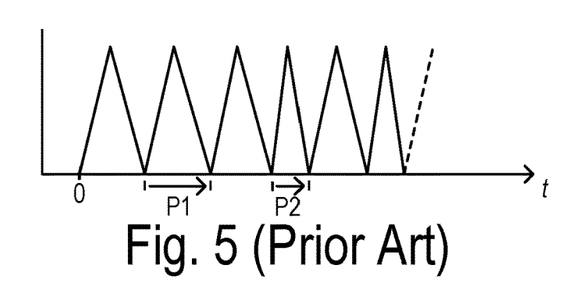
FIG. 5 is a waveform diagram showing a carrier signal according to the sequence of FIG. 4.

FIG. 3 shows an inverter system in greater detail of the type disclosed in Miller et al, U.S. Pat. No. 8,907,604, wherein a PWM controller modifies a PWM drive signal (i.e., switching signal applied to the gates of the inverter switches) according to a modification sequence. The modification sequence is comprised of a pseudorandom pattern of alternating between two different carrier frequencies for the switching of the inverter switches. Thus, controller 38 includes a current/voltage control 50 that monitors current and/or motor position/speed to determine an appropriate duty cycle for the PWM switching and to generate corresponding motor phase signals which are coupled to a comparator 53 in a PWM control 51. A variable frequency carrier signal is coupled to comparator 53 from an oscillator 52. In order to configure the resulting PWM drive signals that are sent by PWM control 51 to inverter bridge 15 such that audible noise and vibration from motor 13 are reduced or optimized, a sequence from a sequence memory 54 is used to control the output frequency from oscillator 52. An example sequence is shown in FIG. 4 wherein the period of the carrier signal is alternated between a period P1 and a period P2 (e.g., about 0.29 milliseconds and about 0.15 ms, respectively). The period can potentially be changed at the end of each period of the carrier signal. The example sequence has a length of 6 carrier periods, and thereafter the same sequence is repeated indefinitely. FIG. 5 shows the carrier signal following the predetermined pseudorandom sequence such that the period of the carrier signal corresponds to period P1 during the first, second, third, and fifth period, and corresponds to period P2 during the fourth and sixth periods.

In the prior art, the sequence is designed in advance using motor/controller modeling techniques that reduced audible noise in general across all operating conditions of the motor. However, acoustic properties may vary at different speed, torque, and supply voltage combinations such that a single sequence has not achieved full optimization in terms of noise reduction or switching loss reduction.

Figure 6:
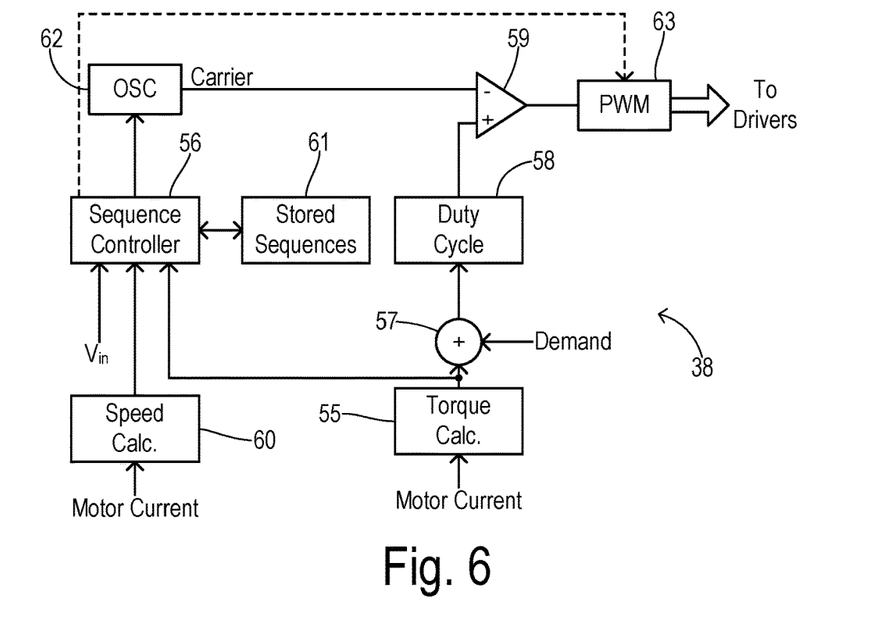
FIG. 6 is a block diagram showing one preferred embodiment of the invention wherein a motor operating point is used to select a corresponding sequence for modifying a PWM drive signal.

To improve overall optimization of noise reduction and switching efficiency, the present invention utilizes a plurality of sequences for varying PWM drive signal characteristics according to an operating point of the motor. As shown in FIG. 6, another embodiment of a PWM controller 38' monitors an operating point in response to one or more conditions of the electric machine. The conditions may include 1) a motor current signal from a current sensor that measures current flowing in the electric machine as a measure of torque, 2) a motor position signal from a rotation sensor monitoring rotation as a measure of speed, and/or 3) an input voltage $V_{in}$ such as the DC link voltage being applied to the inverter bridge. A torque calculator 55 determines instantaneous torque from a current sensor signal as known in the art. Calculated torque from block 55 is provided to a sequence controller 56 for identifying an operating point. The instantaneous torque is also compared with a user-demanded torque signal (e.g., from an accelerator pedal) in a summer 57. A difference between the calculated torque and the demanded torque command is input to a duty cycle block 58 which determines a duty cycle value as known in the art. A duty cycle signal is coupled to the noninverting input of a comparator 59.

The motor position signal is input to a speed calculator block 60 and the calculated speed is coupled to sequence controller 56 along with input voltage $V_{in}$ for identifying the operating point of the electric drive.

Sequence controller 56 uses one or more of the calculated torque, calculated speed, and input voltage for identifying an instantaneous operating point. Then it selects an operating region into which the instantaneous operating point falls. Sequence memory 61 includes a plurality of stored sequences wherein each sequence is optimized for a respective one of the operating regions such that the corresponding predetermined sequence optimizes audible noise and switching losses for the operating points falling within the detected operating region. In one embodiment, the selected sequence is utilized by sequence controller 56 to control operation of an oscillator 62 whereby the resulting frequency of the PWM carrier signal which is coupled to an inverting input of comparator 59 follows the pattern specified by the selected sequence. The output of comparator 59 is coupled to a PWM block 63 for determining the timing of specific drive signals provided to the drivers of each inverter phase leg in an appropriate manner (e.g., including the insertion of dead times to avoid shoot through) as known in the art.

In addition to or instead of using a sequence that modifies the carrier frequency, sequence controller 56 may be further coupled to PWM block 63 for using a sequence adapted to vary the common mode voltage in the PWM drive signals in a manner that alters (e.g., spreads) the audible noise without impacting the resulting phase currents input to the electric machine.

Figure 7:
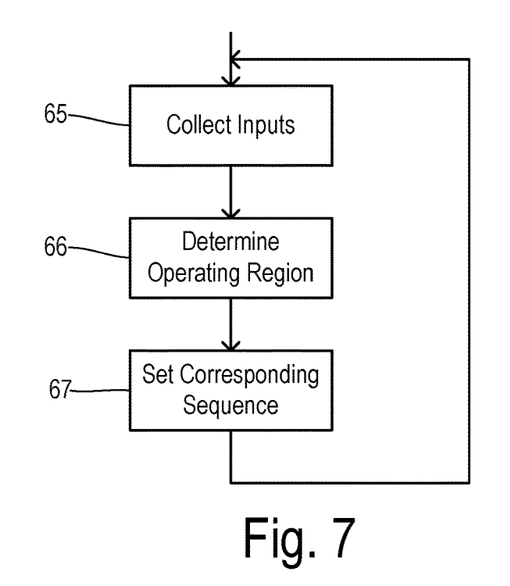
FIG. 7 is a flowchart showing one preferred method of the invention.

FIG. 7 shows one embodiment of an overall method that can be implemented by the system in FIG. 6. Various inputs are collected in step 65 for determining an operating point of the electric drive. In step 66, an operating region corresponding to the collective inputs is determined. Based on the determined operating region, a corresponding sequence is set in step 67. By using a sufficient number of operating regions, a valid optimization can be obtained within each operating region while avoiding excessive loading of the controller or large memory storage requirements.

Figure 8:
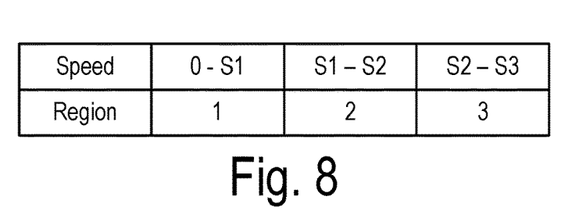
FIG. 8 is a table representing one-dimensional operating regions based on a motor speed.

As shown in FIG. 8, operating regions may be designated using one dimension only, such as speed. Thus, when speed is in a range from zero to a speed S1, then a region #1 is detected. Incremental speed ranges are shown correspond with operating regions #2 and #3, and performance of the electric drive within each of the operating ranges may be separately optimized using a corresponding predetermined sequence. The sequences can be obtained empirically by randomly generating a plurality of sequences for a particular operating range and then measuring the actual noise generation and switching losses that results from each potential sequence in order to find the sequence with the best performance for the corresponding operating region. System modeling can also be employed to determine an optimum sequence for an operating range, either alone or in combination with empirical testing.

Figure 9:
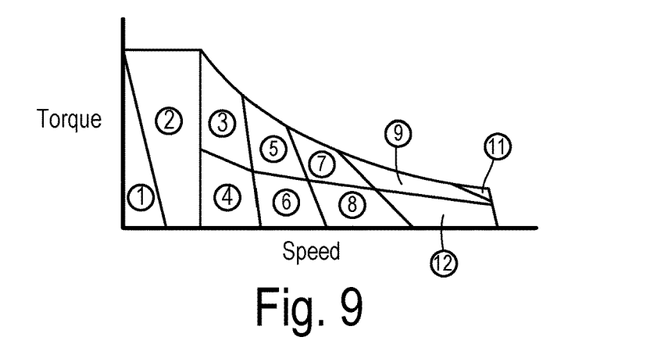
FIG. 9 is a graph representing two-dimensional operating regions based on motor speed and torque.

The operating regions can also be defined either two dimensionally or three-dimensionally. A two-dimensional arrangement of operating regions is shown in FIG. 9 wherein speed and torque ranges are divided according to a plurality of regions 1-11.

Figure 10:
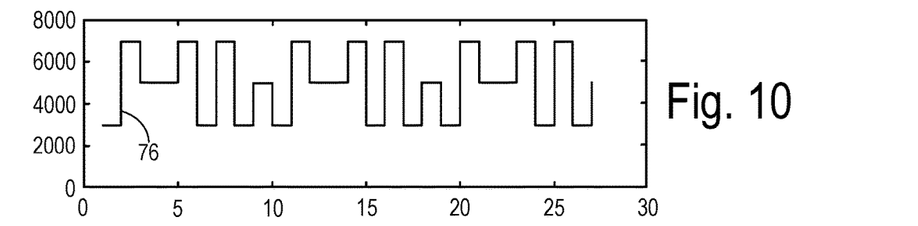
FIGS. 10-12 are graphs representing respective sequences with variations of the carrier frequency.
Figure 11:
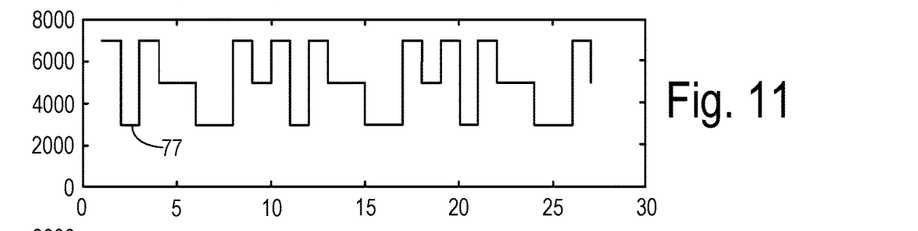
Figure 12:
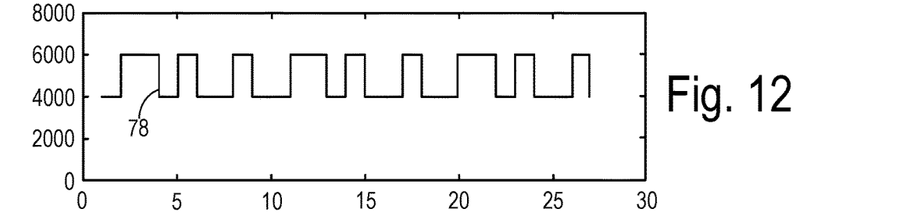

Example sequences for varying a carrier frequency are shown in FIGS. 10-12. Sequences 76 and 77 are each shown with three possible frequency carrier frequency values. A pseudorandom sequence can have any appropriate length. A sequence length having a series of 10 elements is shown, whereby the elements repeat after every 10th wavelength of the carrier signal. In FIG. 12, a sequence 78 is shown having just two possible frequency values.

Figure 13:
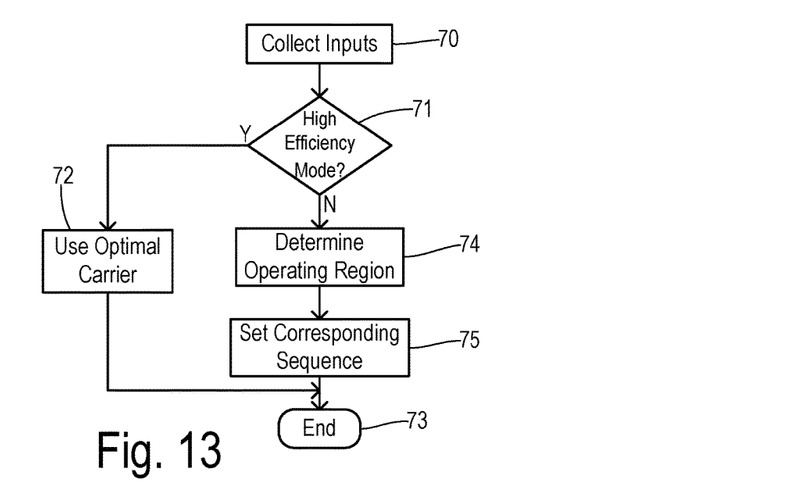
FIG. 13 is a flowchart showing an alternative embodiment of the invention.

The use of variations in the carrier frequency can be selected to allow the use of lower carrier frequencies which reduce switching losses, but there continues to be a tradeoff between noise reduction and switching losses. Under certain conditions such as when attempting to maximize the driving range of an electric vehicle (e.g., when the remaining battery charge is low), it may become necessary to operate a vehicle in a high-efficiency mode that prioritizes efficiency over noise reduction. Thus, a main vehicle controller may initiate a high-efficiency mode automatically or in response to an operator command. The triggering of a high-efficiency mode may then be reported to the various systems for use in adjusting their operation to increase efficiency. As shown in FIG. 13, a further embodiment of the invention incorporates a high-efficiency mode. In step 70, various inputs are collected. A check is performed in step 71 to determine whether a high-efficiency mode is in effect. If so then an optimal carrier frequency strategy is adopted in step 72 which uses the most beneficial carrier frequency for reducing switching losses (e.g., a low frequency). If not in high-efficiency mode, then the operating region is determined in step 74 and a corresponding sequence is set in step 75. In either case, a subroutine of the method ends at step 73, and the procedure is continually re-invoked during vehicle operation.

Figure 14:
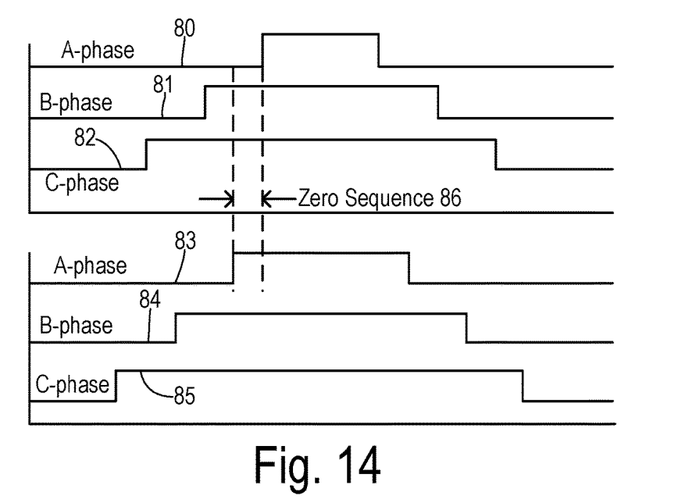
FIG. 14 is a waveform diagram showing modification of a common mode voltage of the PWM drive signals.
Figure 15:
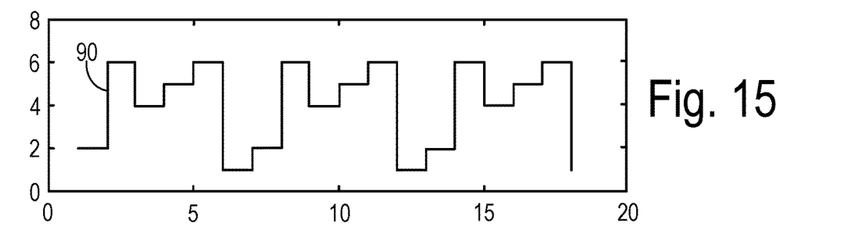
FIGS. 15-17 are graphs representing respective sequences with variations of the common mode voltage.
Figure 16:
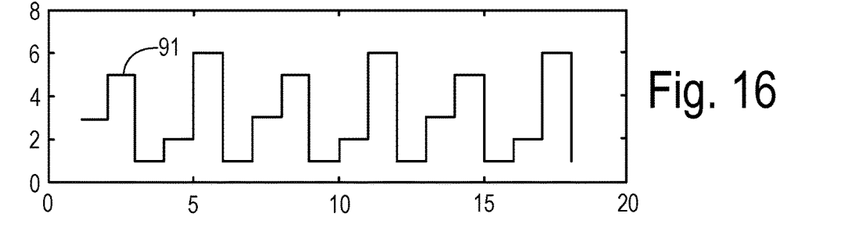
Figure 17:
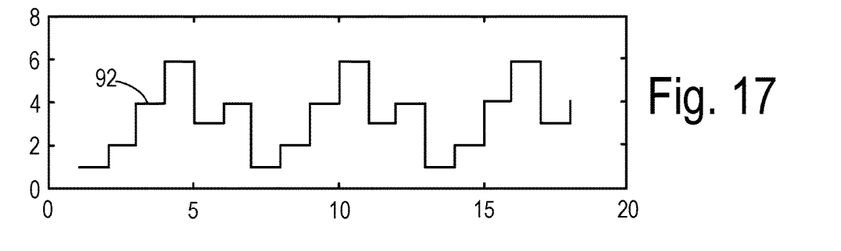

FIG. 14 illustrates the variation in common mode voltage. An original, unaltered version of the three-phase PWM voltages 80, 81, and 82 are shown for phases A, B, and C, respectively, at the top of the figure. By inserting a zero sequence 86 at the beginning and end of the switching points for each phase as shown at PWM voltages 83, 84, and 85, the common mode voltage is modified without altering the torque production of the electric machine. An effect of varying the PWM common mode voltage is similar to the variations in PWM carrier frequency in that the audible noise spectrum is spread out and becomes less objectionable. The size of the added zero sequence 86 is manipulated to generate pseudorandom common mode voltage sequences 90, 91, and 92 as shown in FIGS. 15-17.

What is claimed is:

1. An electric drive for a vehicle, comprising:
    an inverter circuit configured to provide a multi-phase AC drive signal to an electric machine according to a PWM drive signal;
    a PWM controller monitoring an operating point of the electric drive and configured to identify an operating region of the electric drive from a plurality of predetermined regions in response to the monitored operating point; and
    a sequence memory storing a plurality of fixed sequences, each sequence having a pseudorandom variation optimized for a respective one of the predetermined regions to reduce audible noise and switching losses;
    wherein the PWM controller generates the PWM drive signal according to a respective fixed sequence corresponding to the identified operating region.

2. The electric drive of claim 1 further comprising:
    a current sensor monitoring a current flowing in the electric machine as a measure of a torque produced by the electric machine;
    wherein the operating point is comprised the measured torque.

3. The electric drive of claim 1 further comprising:
    a rotation sensor monitoring a rotation the electric machine as a measure of a rotational speed of the electric machine;
    wherein the operating point is comprised the measured speed.

4. The electric drive of claim 1 further comprising:
    a current sensor monitoring a current flowing in the electric machine as a measure of a torque produced by the electric machine; and
    a rotation sensor monitoring a rotation the electric machine as a measure of a rotational speed of the electric machine;
    wherein the operating point is comprised the measured torque and the measured speed.

5. The electric drive of claim 1 wherein each sequence comprises a corresponding variation of a carrier frequency of the PWM drive signal.

6. The electric drive of claim 5 wherein each sequence comprises a predetermined pseudorandom pattern of switching between predetermined carrier frequencies.

7. The electric drive of claim 1 wherein each sequence comprises a corresponding variation of a common mode voltage of the PWM drive signal.

8. The electric drive of claim 1 wherein the PWM controller is configured to detect a high efficiency mode, and wherein the PWM controller generates the PWM drive signal without the plurality of sequences during the high efficiency mode without regard to reducing audible noise.

9. A method of generating a PWM drive signal for an inverter circuit coupled to an electric machine in an electrified vehicle, comprising the steps of:
monitoring an operating point of the electric drive;
identifying an operating region of the electric drive from a plurality of predetermined regions in response to the monitored operating point;
selecting a fixed sequence from a plurality of stored sequences wherein the selected fixed sequence has a pseudorandom variation optimized for the identified operating region to reduce audible noise or switching losses;
generating the PWM drive signal following the selected fixed sequence until the monitored operating point corresponds to a different operating region.

10. The method of claims 9 wherein monitoring the operating point is comprised of monitoring a current flowing in the electric machine and determining a torque produced by the electric machine in response to the monitored current.

11. The method of claim 9 wherein monitoring the operating point is comprised of monitoring a rotation the electric machine and determining a rotational speed of the electric machine in response to the monitored speed.

12. The method of claim 9 wherein monitoring the operating point is comprised of monitoring a current flowing in the electric machine, determining a torque produced by the electric machine in response to the monitored current, monitoring a rotation the electric machine, and determining a rotational speed of the electric machine in response to the monitored speed.

13. The method of claim 9 wherein each sequence comprises a corresponding variation of a carrier frequency of the PWM drive signal.

14. The method of claim 13 wherein each sequence comprises a predetermined pseudorandom pattern of switching between predetermined carrier frequencies.

15. The method of claim 9 wherein each sequence comprises a corresponding variation of a common mode voltage of the PWM drive signal.

16. The method of claim 9 further comprising the steps of:
initiating a high efficiency mode; and
generating the PWM drive signal without the plurality of sequences during the high efficiency mode without regard to reducing audible noise.

17. An electrified vehicle comprising:
a motor;
an inverter bridge converting a DC voltage to an AC voltage energizing the motor;
a controller switching the bridge via a PWM drive signal, wherein the controller varies a carrier frequency of the drive signal using a fixed sequence of frequencies selected from a plurality of predetermined sequences based on a motor operating region, wherein each sequence pseudorandomly varies the carrier frequency to optimize audible noise from the motor.

18. The vehicle of claim 17 wherein the motor operating region is defined according to a torque delivered by the motor and a rotational speed of the motor.

19. The vehicle of claim 17 wherein each sequence pseudorandomly varies the carrier frequency between two predetermined frequencies which are each within an audible spectrum.

20. The vehicle of claim 17 wherein each sequence pseudorandomly varies the carrier frequency between three predetermined frequencies which are each within an audible spectrum.

* * * * *